No. 769,785. PATENTED SEPT. 13, 1904.
W. BRUEN.
JUICE EXTRACTOR.
APPLICATION FILED APR. 20, 1904.
NO MODEL. 2 SHEETS—SHEET 1.

WITNESSES:
Geo. D. Richards
W. H. Fraentzel

INVENTOR:
William Bruen,
BY
Fred C. Fraentzel,
ATTORNEY

No. 769,785. PATENTED SEPT. 13, 1904.
W. BRUEN.
JUICE EXTRACTOR.
APPLICATION FILED APR. 20, 1904.
NO MODEL. 2 SHEETS—SHEET 2.
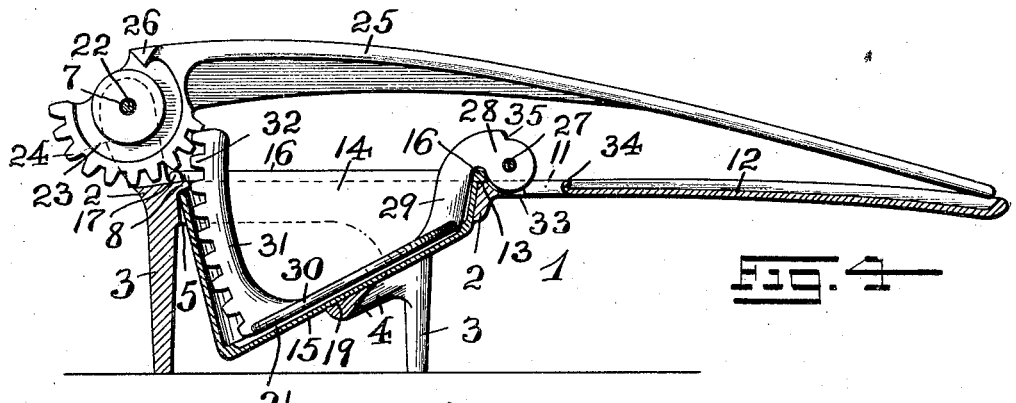
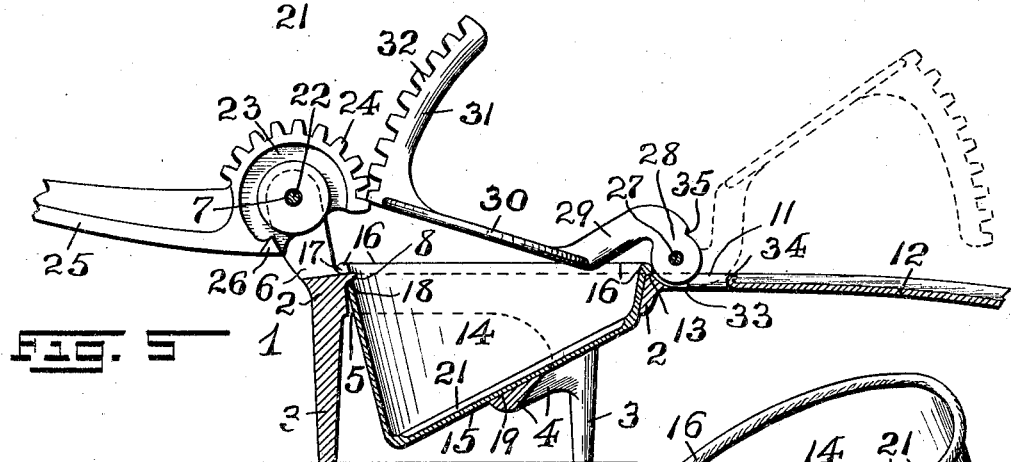
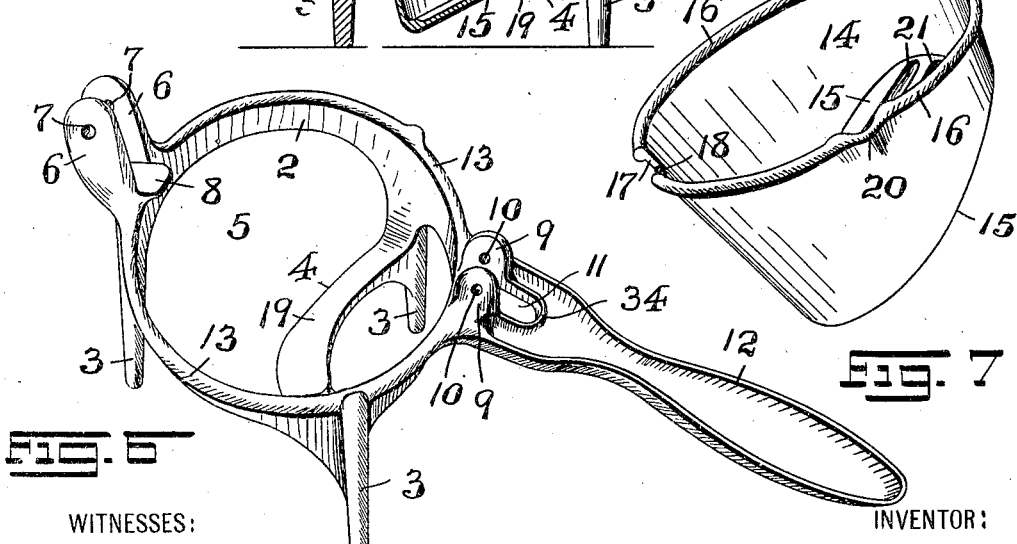
WITNESSES: Geo. D. Richards, W. B. Fraentzel
INVENTOR: William Bruen,
BY Fred C. Fraentzel, ATTORNEY No. 769,785.

Patented September 13, 1904.

UNITED STATES PATENT OFFICE.

WILLIAM BRUEN, OF NEWARK, NEW JERSEY, ASSIGNOR TO FRANK BRABSON, OF NEWARK, NEW JERSEY.

JUICE-EXTRACTOR.

SPECIFICATION forming part of Letters Patent No. 769,785, dated September 13, 1904.

Application filed April 20, 1904. Serial No. 204,002. (No model.)

*To all whom it may concern:*

Be it known that I, WILLIAM BRUEN, a citizen of the United States, residing at Newark, in the county of Essex and State of New Jersey, have invented certain new and useful Improvements in Juice-Extractors; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The present invention has reference to improvements in devices or implements employed to extract the juices from fruits—such as lemons, oranges, and the like—and also from other matter; and this invention has for its principal object to provide a simply-constructed and easily-manipulated device for thoroughly extracting the juices from fruits, meats, and the like, and, furthermore, to provide a device in which the operative parts are but few and cannot get out of order, the squeezer or presser-plate having a positive movement and being arranged in such a manner against a preferably inclined bottom of a receiving-cup or similar receptacle that the pulp and seeds of the squeezed fruit or other matter may be retained within the said receiver or cup while in the act of pouring the clear juice from the same.

Other objects of this invention not at this time more particularly specified will be clearly evident from the following detailed description of the device.

The invention consists, primarily, in the novel construction of juice-extracting device or implement hereinafter set forth; and, furthermore, this invention consists in the arrangements and combinations of the devices and parts, as well as in the details of the construction of the said parts, all of which will be fully described in the following specification and then finally embodied in the clauses of the claim, which is appended to and which forms an essential part of this specification.

The invention is clearly illustrated in the accompanying drawings, in which—

Figure 1:
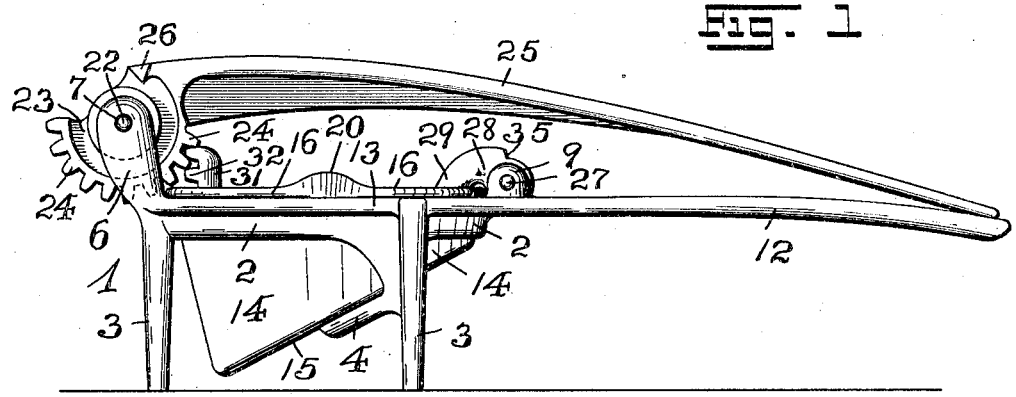
Figure 2:
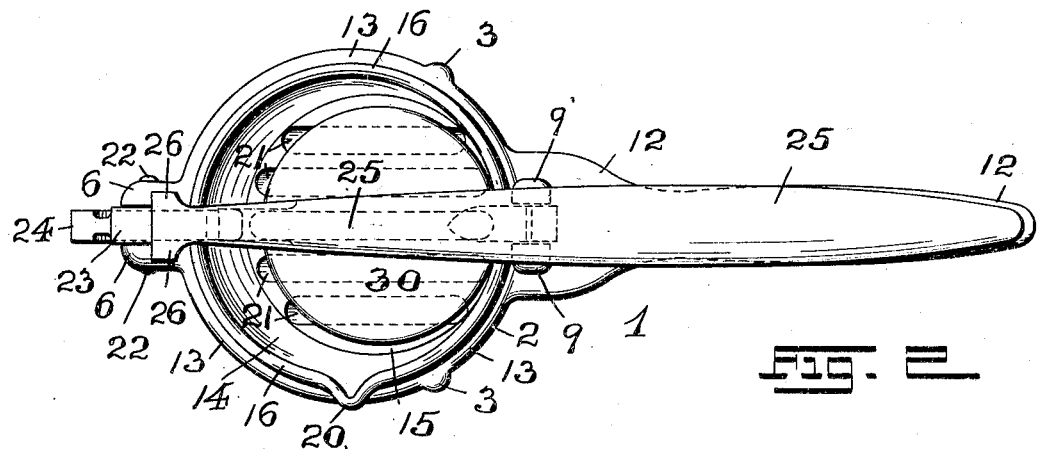
Figure 3:
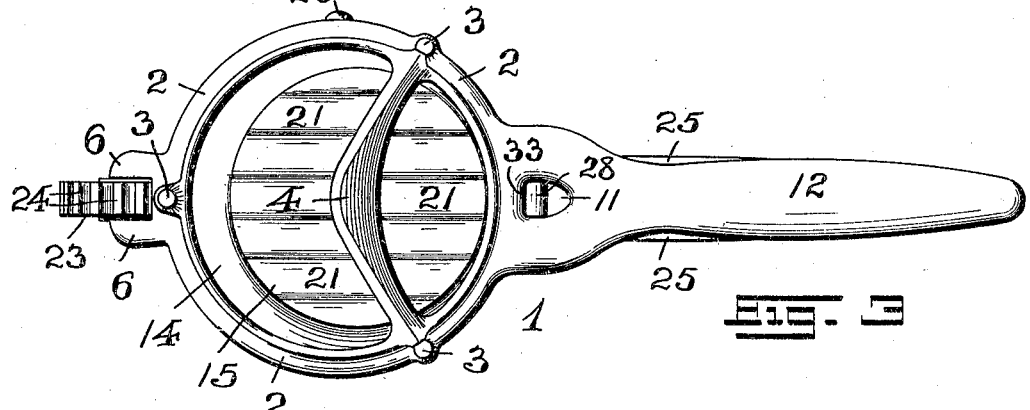

Figure 1 is a side elevation, Fig. 2 a top view, and Fig. 3 a bottom view, of a juice-extracting device or implement embodying the principles of my present invention. Fig. 4 is a central longitudinal vertical section of the device or implement, illustrating the parts of the device in their actuated positions after the matter which is to be squeezed has thus been squeezed and some of said parts of the device being represented in side elevation. Fig. 5 is a similar sectional representation of the device, certain handle portions or levers being represented as being broken away, the said view also illustrating the actuating means for squeezing the fruit or meat or the like in their normally inoperative and disengaged relations to permit of the placing of the matter which is to be squeezed and from which the juice is to be extracted in the receiver or cup or to remove the pulp and seeds from such receiver or cup after the juice has been extracted. Fig. 6 is a perspective view of the main supporting frame or body of the device or implement, and Fig. 7 is a similar view of the receiver or cup.

Similar characters of reference are employed in the above-described views to indicate corresponding parts.

Referring now to the several figures of the drawings, the reference character 1 indicates the complete device or implement for the extracting of juices from fruits, meats, and the like, the said device comprising a main supporting-frame, a receiver, cup, or juice-receptacle, and actuating mechanism or means for squeezing the fruit, meat, or the like and extracting the juices therefrom, which are to be collected in said receiver or juice-receptacle. The said supporting-frame consists, essentially, of a ring-shaped body 2, provided with any desirable number of supports or legs 3, preferably three of such supports or legs being employed, as illustrated in the drawings, and two of such supports or legs being preferably connected by means of a brace or bar 4, extending directly across the open part 5 of the said ring-shaped body 2 at a suitable distance below the said body, substantially as illustrated and for the purposes hereinafter more particularly specified. At one end of the said ring-shaped body 2 is a suitable support, formed, preferably, by a pair of upwardly-extending ears or lugs 6, provided with perforations 7, forming bearings, and with an extension or projection 8, forming a suitable lip, which extends in an inward direction from the said ring-shaped body 2 into its open part 5, substantially as illustrated in Figs. 4, 5, and 6 of the drawings. Diametrically opposite the support formed by the ears or lugs 6 is another suitably-constructed support, which is formed, preferably, by a pair of upwardly-extending ears or lugs 9, provided with perforations 10, forming bearings. Between the said ears or lugs 9 is an opening 11 and a rearwardly-extending handle 12. The upper marginal edge 13 of the said ring-shaped body 2 is made, preferably, in the form of a bead. Removably arranged in the opening 5 of the said ring-shaped body 2 is a cup, receiver, or juice-receptacle 14, the same being made, preferably, with an inclined bottom or base 15 and with a marginal bead 16, extending around the upper edge of the said cup, receiver, or receptacle. The said receiver or receptacle is also made with an open or cut-away part 17, having an edge 18, substantially as illustrated. From an inspection more particularly of Figs. 4 and 5 of the drawings it will be seen that when the said cup, receiver, or receptacle 14 is placed in the open part 5 of the said ring-shaped body 2 the inclined bottom or base 15 of the said receiver or receptacle 14 will rest directly upon the upper and inclined surface 19 of the brace or bar 4, and its marginal bead 16 at the same time rests upon the upper marginal bead or surrounding edge 13 of the ring-shaped body 2, with the lip or projection 8 of said ring-shaped body 2 extending into the cut-away or open portion 17 of the said receiver or receptacle 14, the said lip or projection 8 being also in holding or retaining engagement with the edge 18 of the said cut-away or open part 17 to prevent the displacement of the said receiver or receptacle 14 from within the said ring-shaped body 2 should the said receiver or receptacle have its bottom forcibly brought by accident or otherwise in contact with some foreign object or body. When the said receiver or receptable 14 is in its position within the said ring-shaped body 2, the brace or bar 4 between the supports or legs 3 also acts to retain the said receiver or receptacle rigidly in its operative position, as will be clearly understood. From an inspection of Figs. 2 and 7 it will be seen that the said receiver or receptacle 14 is also made at the one side with a suitable pouring-spout or mouth 20, and in its bottom the said receiver or receptacle may be made with corrugations, as 21, which lead from the highest part of the said bottom to the deepest portion thereof.

Arranged upon a pin 22 in the perforations or bearings 7 of the ears or lugs 6, so as to be capable of oscillation between the said posts, is a toothed sector 23 or other suitably-shaped plate provided with gear-teeth 24, from which extends an operating handle or lever 25, which may be provided on one or both of its sides with suitably-shaped projections 26, forming stops which can be brought in engagement with the edges of the said ears or lugs 6, as illustrated in Fig. 5 of the drawings, and thereby limit the backward-swinging movement of the said handle or lever 25 and its toothed plate or sector 23. Pivotally arranged upon a pin 27 in the perforations or bearings 10 of the other set of ears or lugs 9 is an arm 28, which has a downwardly-curved portion 29, connected with a presser-plate or disk 30, preferably of a circular configuration and of substantially the same or slightly smaller diameter than the diameter of the inner portion of the inclined bottom or base 15 of the said cup, receiver, or receptacle 14. Extending from the said presser-plate or disk 30 in an upward direction and at a point diametrically opposite the point of connection of the said plate or disk 30 with the curved portion 29 of the arm 28 is a second arm or suitably-curved rack 31, provided with gear-teeth 32, which can be brought in operative engagement or mesh with the gear-teeth 24 of the plate or sector 23 when the parts are in the positions indicated in Figs. 1, 2, 4, and 5, but which can be thrown entirely out of engagement or mesh when the said disk or plate 30 and the parts connected therewith have been turned in the positions indicated by the dotted outlines in said Fig. 5. That these said parts may be retained in this open or separated relation with the remaining parts of the device or implement the said arm 28 may be provided with a suitably-disposed projection 35 or other suitable stop, which can be brought in engagement with a portion 33 of the marginal edge of the ring-shaped body 2, (see Figs. 3 and 5,) a portion of the said arm 28 resting also upon the edge 34 of the handle 12, and thus retaining these parts in the said position, as clearly indicated in said Fig. 5 of the drawings.

To use the device or implement for the extraction of juices, the handle 25 is thrown into the position indicated in said Fig. 5, whereby the disk or plate 30 is inclined at an angle above the receiver or receptacle 14, as shown, and the disk or plate is next brought into the position indicated in the dotted outline in the said figure. The fruit, meat, or other material from which the juice is to be extracted is then placed in the receiver or receptacle 14 and the disk or plate 30 once more returned to its former position above the said receiver or receptacle 14, with its lower gear-tooth resting upon the lower gear-tooth of the sector or plate 23, as illustrated. The operator now takes hold of the arm or lever 25 and moves it from the position indicated in said Fig. 5 to a position above the handle 12, substantially as illustrated in Figs. 1 to 4, inclusive, whereby the toothed sector or plate 23, having engaged the toothed arm or rack 31, the presser-plate or disk has been made to enter the receiver or receptacle 14, as clearly illustrated, and in so doing mashes or squeezes the fruit or other matter previously placed within the said cup, receiver, or receptacle 14, as has been stated. When the disk or plate 30 has been lowered into the said cup, receiver, or receptacle 14 to its fullest extent, with the handle or lever 25 arranged in close proximity above the handle 12, all the squeezed pulp and seeds will be retained between the bottom 15 of the receptacle 14 and the disk or plate 30, while that part of the receiver or receptacle above the upper surface of the said plate or disk 30 will contain the extracted juices, the latter having passed down the passages formed by the corrugations 21 in the base or bottom of the cup, receiver, or receptacle 14, and thence above the said disk or plate 30, as will be evident. By grasping the two handles 25 and 12 in the hand and by tilting the device or implement to the one side the extracted juice can be poured from the spout 20 of the cup, receiver, or receptacle 14 into a tumbler or other receptacle. To remove the pulp and seed after having poured off the juice the lever or handle 25 and the plate or disk 30, with their parts, are again thrown back to their full extent allowed by their respective stops to permit of the cup, receiver, or receptacle 14 to be removed from the ring-shaped body 2 to be cleansed and then again returned to its former position within the said ring-shaped body 2.

From an inspection of Figs. 3, 4, 5, and 6 it will be seen that the arrangement of the brace or bar 4 is such that it rests beneath the central portion of the inclined bottom or base 15 of the cup, receiver, or receptacle 14 and acts as a support to prevent any undue strain upon the ring-shaped body 2 or upon the body or base of the said receiver or receptacle 14 when using the presser plate or disk 30 for the extraction of the juices.

It will be seen that the action of all the parts is positive, and there being but few movable parts the device can easily be kept clean and will not get out of order.

I am aware that some changes may be made in the arrangements and combinations of the devices and their parts, as well as in the details of the construction of the said parts, without departing from the scope of my present invention. Hence I do not limit my invention to the exact arrangements and combinations of the devices and their parts as described in the foregoing specification and as illustrated in the accompanying drawings, nor do I confine myself to the exact details of the construction of any of the said parts.

Having thus described my invention, what I claim is—

1. A juice-extractor comprising a frame having a receiving-opening and a handle, a receiver removably arranged in the opening of said frame, a presser-plate pivotally connected with said frame, a presser-plate-operating means also pivotally connected with another portion of said frame provided with a handle adapted to be moved over the handle of said frame for grasping the two handles in the hand and pouring the extracted juice from the receiver while in position in said frame, substantially as and for the purposes set forth.

2. A juice-extractor comprising a frame having a receiving-opening and a handle, a receiver removably arranged in the opening of said frame, said receiver being formed with an inclined bottom, a presser-plate pivotally connected with said frame, and a presser-plate-operating means also pivotally connected with another portion of said frame for forcing said plate into said receiver and upon the inclined bottom thereof, substantially as and for the purposes set forth.

3. A juice-extractor comprising a frame having a receiving-opening and a handle, a receiver removably arranged in the opening of said frame, said receiver being formed with an inclined bottom, a presser-plate pivotally connected with said frame, and means connected with said frame and said presser-plate for forcing said plate into said receiver and upon the inclined bottom thereof, consisting, essentially, of a toothed rack on said presser-plate, a toothed sector pivotally connected with said frame having its teeth in mesh with the teeth of said rack, and a handle extending from said toothed sector adapted to be moved over the handle of said frame for grasping the two handles in the hand and pouring the extracted juice from the receiver while in position in said frame, substantially as and for the purposes set forth.

4. A juice-extractor comprising a ring-shaped body having a receiving-opening, supports extending from said body, a brace between said supports, a receiver removably arranged in the said opening having its bottom resting upon said brace, and a presser-plate-operating means connected with the said frame, substantially as and for the purposes set forth.

5. A juice-extractor comprising a ring-shaped body having a receiving-opening, supports extending from said body, a brace between said supports, a receiver removably arranged in the said opening having its bottom resting upon said brace, a presser-plate-operating means connected with the said frame, a handle extending from said means, and a handle connected with said frame over which the handle of said presser-plate-operating means can be moved for grasping the two handles in the hand and pouring the extracted juice from the receiver while in position in the said frame, substantially as and for the purposes set forth.

6. A juice-extractor comprising a ring-shaped body having a receiving-opening, supports extending from said body, a brace between said supports, said brace having an upper inclined surface, a receiver removably arranged in the said opening provided with an inclined bottom resting upon the inclined surface of said brace, and a presser-plate-operating means connected with the said frame, substantially as and for the purposes set forth.

7. A juice-extractor comprising a ring-shaped body having a receiving-opening, supports extending from said body, a brace between said supports, said brace having an upper inclined surface, a receiver removably arranged in the said opening provided with an inclined bottom resting upon the inclined surface of said brace, a presser-plate-operating means connected with the said frame, a handle extending from said means, and a handle connected with said frame over which the handle of said presser-plate-operating means can be moved for grasping the two handles in the hand and pouring the extracted juice from the receiver while in position in the said frame, substantially as and for the purposes set forth.

8. In a juice-extractor, a ring-shaped body having a receiving-opening, a lip on said body extending into the said opening, and a receiver removably arranged in the said opening and having a portion in holding engagement with the said lip, a presser-plate pivotally connected with said ring-shaped body at a point directly opposite said lip, and a presser-plate-operating means pivotally connected with said ring-shaped body at a point above the said lip, substantially as and for the purposes set forth.

9. In a juice-extractor, a ring-shaped body having a receiving-opening, supports extending from said body, a brace between said supports, a lip on said ring-shaped body extending into the said opening, and a receiver removably arranged in the said opening, said receiver having its bottom resting upon the said brace and a portion of said receiver being also in holding engagement with the said lip, substantially as and for the purposes set forth.

10. In a juice-extractor, the combination, with a ring-shaped body having a receiving-opening, a handle, and a pair of diametrically oppositely placed supports upon the said ring-shaped body, of a receiver in the opening of said ring-shaped body, a presser-plate pivotally connected with one of the said supports, so as to be capable of a movement within the said receiver, and an upwardly-extending toothed rack upon said presser-plate, a toothed sector pivotally connected with the other support on said ring-shaped body, said toothed sector being in mesh with the said rack, and a handle connected with said toothed sector, substantially as and for the purposes set forth.

11. In a juice-extractor, the combination, with a ring-shaped body having a receiving-opening, a handle, and a pair of diametrically oppositely placed bearing-supports upon the said ring-shaped body, supporting-legs extending from the said ring-shaped body, and a brace between said supporting-legs, said brace having an upper inclined surface, of a receiver in the said opening provided with an inclined bottom resting upon the inclined surface of the said brace, a presser-plate pivotally connected with one of the bearing-supports of said ring-shaped body, so as to be capable of a movement within the said receiver, and an upwardly-extending toothed rack on said presser-plate, a toothed sector pivotally connected with the other bearing-support on said ring-shaped body, said toothed sector being in mesh with the said rack, and a handle connected with said toothed sector, substantially as and for the purposes set forth.

In testimony that I claim the invention set forth above I have hereunto set my hand this 19th day of April, 1904.

WILLIAM BRUEN.

Witnesses:
FREDK. C. FRAENTZEL,
FRANK BRABSON.